United States Patent
Lavery et al.

(10) Patent No.: US 10,762,312 B2
(45) Date of Patent: Sep. 1, 2020

(54) OPERATIONS OF MOBILE RFID READERS IN A VENUE HAVING FIXED RFID READERS

(71) Applicant: SYMBOL TECHNOLOGIES, LLC, Lincolnshire, IL (US)

(72) Inventors: Richard J. Lavery, Huntington, NY (US); Russell Calvarese, Stony Brook, NY (US); Charles G. Lauria, Miller Place, NY (US); Timothy B. Austin, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 122 days.

(21) Appl. No.: 15/826,197

(22) Filed: Nov. 29, 2017

(65) Prior Publication Data

US 2019/0163942 A1    May 30, 2019

(51) Int. Cl.
*G06K 7/10* (2006.01)
*G06Q 10/08* (2012.01)
*G06K 19/06* (2006.01)

(52) U.S. Cl.
CPC ..... *G06K 7/10415* (2013.01); *G06K 7/10376* (2013.01); *G06K 19/06028* (2013.01); *G06Q 10/087* (2013.01)

(58) Field of Classification Search
CPC ........... G06K 7/10415; G06K 7/10376; G06K 19/06028; G06Q 10/087
See application file for complete search history.

(56) References Cited

U.S. PATENT DOCUMENTS

| | | | | | |
|---|---|---|---|---|---|
| 5,963,144 | A * | 10/1999 | Kruest | ............... | G06K 19/0723 340/10.1 |
| 7,295,114 | B1 * | 11/2007 | Drzaic | ................... | A62B 99/00 235/385 |
| 7,486,188 | B2 * | 2/2009 | Van Alstyne | .......... | G06Q 10/08 340/10.1 |
| 8,031,070 | B2 * | 10/2011 | Fabre | ................... | B65G 1/1371 340/572.1 |
| 8,217,793 | B2 * | 7/2012 | Broer | ................. | G06K 7/10356 340/572.1 |
| 9,076,052 | B2 * | 7/2015 | Chang | ................ | G06K 7/10475 |
| 9,092,679 | B2 * | 7/2015 | Jones | ................ | G06K 7/10356 |
| 10,152,617 | B2 * | 12/2018 | Belstner | ............ | G06K 7/10039 |
| 10,157,303 | B1 * | 12/2018 | Lavery | ............... | G06K 7/10425 |
| 10,445,632 | B2 * | 10/2019 | Kelsey | ............... | G06K 19/0723 |
| 2014/0266621 | A1 * | 9/2014 | Jones | ................ | G06K 7/10227 340/10.1 |
| 2018/0144569 | A1 * | 5/2018 | Einberg | ................ | H04W 4/027 |
| 2019/0080281 | A1 * | 3/2019 | Tingler | ............... | G06Q 10/087 |

* cited by examiner

*Primary Examiner* — Christle I Marshall
*Assistant Examiner* — Asifa Habib
(74) *Attorney, Agent, or Firm* — Yuri Astvatsaturov (57) ABSTRACT

The present disclosure generally relates to the field of asset tracking via RFID. In an embodiment, the present disclosure describes a system that selectively deactivates at least some of the plurality of fixed RFID readers that are disposed within a venue based on a location determination of an active mobile RFID reader.

19 Claims, 6 Drawing Sheets

OPERATIONS OF MOBILE RFID READERS IN A VENUE HAVING FIXED RFID READERS

BACKGROUND

Certain venues, like for example retail stores, now use radio frequency (RF) identification (RFID) technology to provide asset tracking, enabling better and more accurate accounting of products and any other items which may have RFID tags attached thereto. In some cases, this is done by providing a network of RFID readers fixedly mounted at various points throughout the venue and by having those readers constantly monitor for RFID activity within their respective read-zones. While effective to some extent, RF signals generated by these fixed readers do not always propagate in a manner that is sufficient to read all RFID tags, causing some of the tag not to be interrogated and leaving some room for accounting error.

To address this issue, a more precision-driven approach is periodically implemented where, for example, a store employee inventories the products with the use of a mobile RFID reader that can be positioned in closer proximity and aimed with better accuracy relative to the products being inventoried, and consequently, relative to the RFID tags affixed thereto. However, in many instances the fixed RFID readers are configured to operate around the clock, and what has been observed is that RF energy emitted by the network of fixed RFID readers can interfere with the reading operation of the mobile reader used by the employee. Additionally, it is desirable to avoid shutting down the network of fixed readers for any extensive period of time as such a shutdown could cause RFID-trackable events to be missed.

Consequently, there exists a need for systems and methods that address the issue of interference between fixed and mobile RFID readers operated within a venue without a system-wide shutdown of the fixed readers for any extensive amount of time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a system for operating a mobile radio frequency (RF) identification (RFID) reader in a venue having a network of fixed RFID readers. The system includes: (1) a plurality of fixed RFID readers, each of the plurality of fixed RFID readers having an antenna defining a respective read-zone; (2) a database containing inventory data related to a plurality of RFID tags, for each of the plurality of RFID tags the inventory data including an approximate tag location within the venue; and (3) a controller communicatively coupled to the plurality of fixed RFID readers, the mobile RFID reader, and the database, the controller being configured to: (i) detect the mobile RFID reader reading at least one of the plurality of RFID tags; determine an approximate location of the mobile RFID reader based on the respective approximate tag location of each of the at least one of the plurality of RFID tags read by the mobile RFID reader; (ii) determine which of the respective read-zones overlaps with the approximate location of the mobile RFID reader; and (iii) deactivate each of the fixed RFID readers whose antennae have the respective read-zones overlap with the approximate location of the mobile RFID reader.

In a variation of this embodiment, the database includes additional inventory data related at least one unlocated RFID tag, for each of the at least one unlocated RFID tag the additional inventory data including a corresponding unlocated RFID tag universal product code (UPC); and for each of the plurality of RFID tags, the inventory data further includes a corresponding located RFID tag UPC. In this case, the controller is further configured to: detect the mobile RFID reader reading a first unlocated RFID tag; and determine the approximate location of the mobile RFID reader based on the respective approximate location of at least one of the plurality of RFID tags that has the corresponding located RFID tag UPC equal to the corresponding unlocated RFID tag UPC of the first unlocated RFID tag.

In another embodiment, the present invention is a system for operating a mobile RFID reader in a venue having a network of fixed RFID readers. The system includes: (1) a locationing sub-system operable to detect an approximate location of the mobile RFID device; (2) a plurality of fixed RFID readers, each of the plurality of fixed RFID readers having an antenna defining a respective read-zone; and (3) a controller communicatively coupled to the plurality of fixed RFID readers, the mobile RFID reader, and the locationing sub-system, the controller being configured to: (i) detect a triggering of an RFID-tag read operation on the mobile RFID reader; (ii) determine which of the respective read-zones overlaps with the approximate location of the mobile RFID reader at a time of the triggering of the RFID-tag read operation; and (iii) deactivate each of the fixed RFID readers whose antennae have the respective read-zones overlap with the approximate location of the mobile RFID reader.

Figure 1:
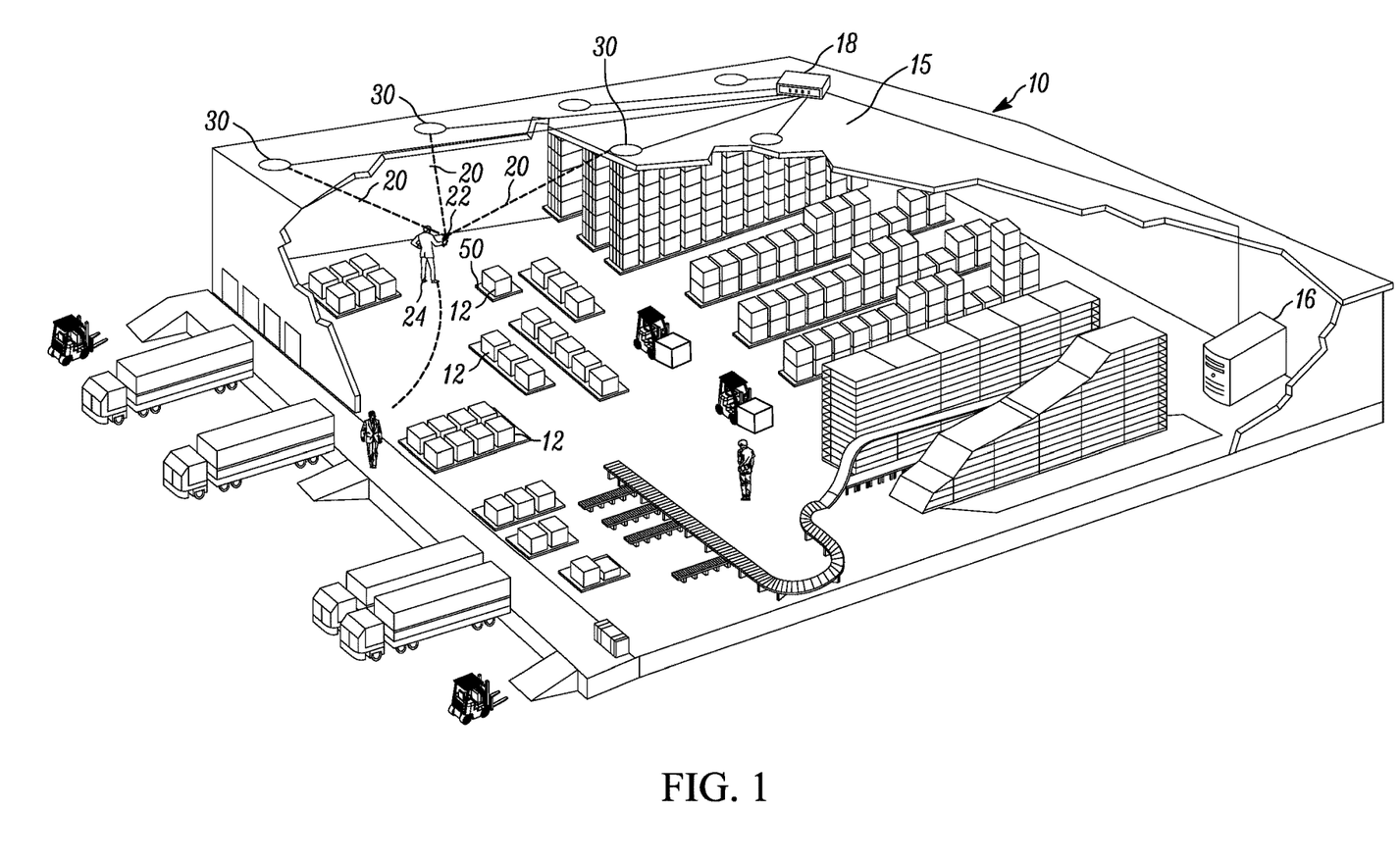
FIG. 1 illustrates a perspective cutaway view of a venue in accordance with an embodiment of the present invention.
Figure 2:
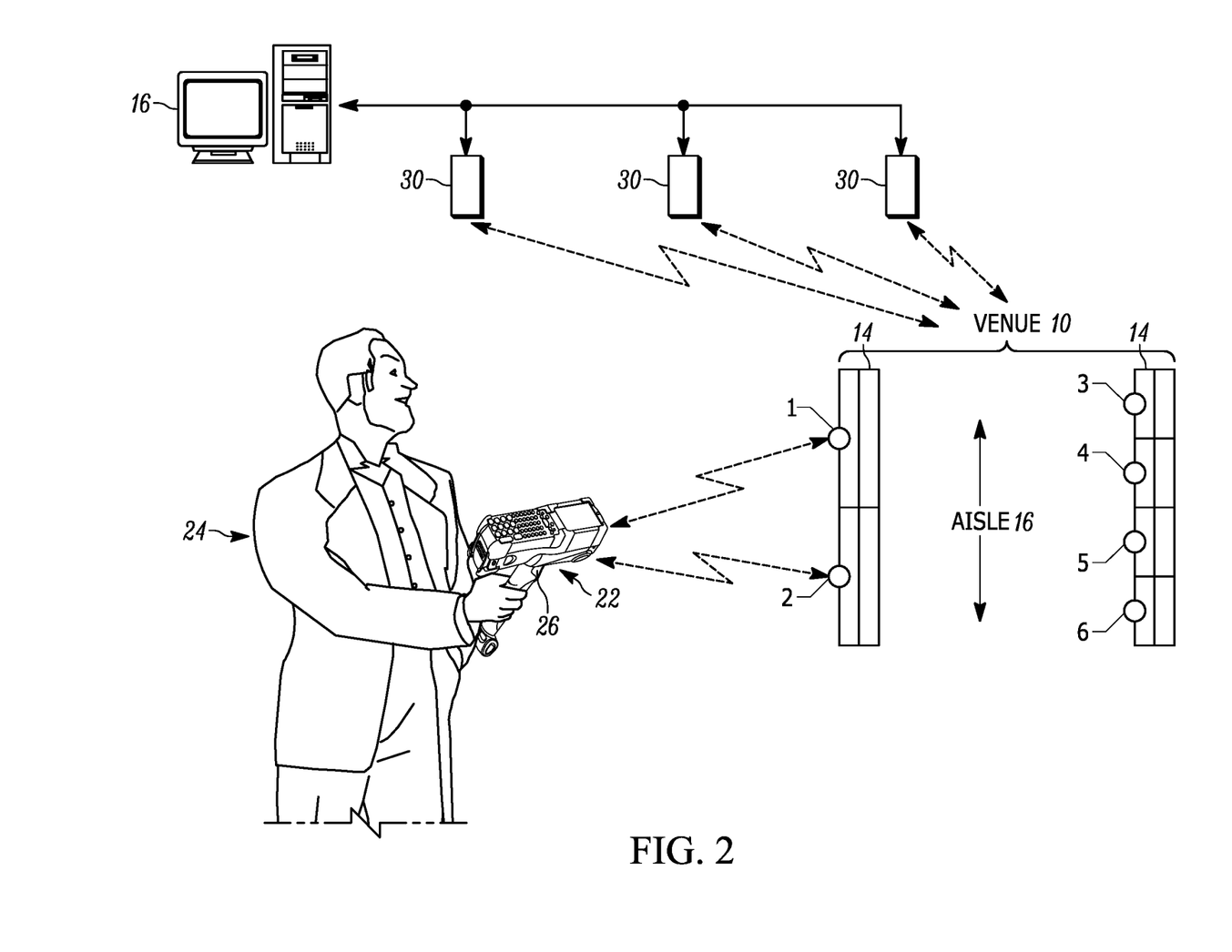
FIGS. 2 and 3 illustrate schematic block diagrams of elements utilized for interrogation of RFID tags within the venue of FIG. 1.

Referring now to the drawings, reference numeral 10 in FIG. 1 generally depicts a warehouse environment or venue in which products 12, shown in FIG. 1 as cuboid cartons for simplicity, are located. The venue 10 may be any indoor or outdoor venue (e.g., a retail store, warehouse, etc.), and may have any layout or configuration. As shown in FIG. 2, the venue 10 may have, for example, a plurality of shelving structures 14 separated by aisles 16, and a plurality of the products 12, also identified by numerals 1-6, can be stocked on the shelving structures. Each product 12 is preferably tagged with an RFID tag 100, preferably a passive RFID tag for cost reasons, and, in some applications, each RFID product tag 100 may be associated with a pallet 50 (see, e.g., FIG. 1), or a container, for supporting multiple products 12.

Figure 3:
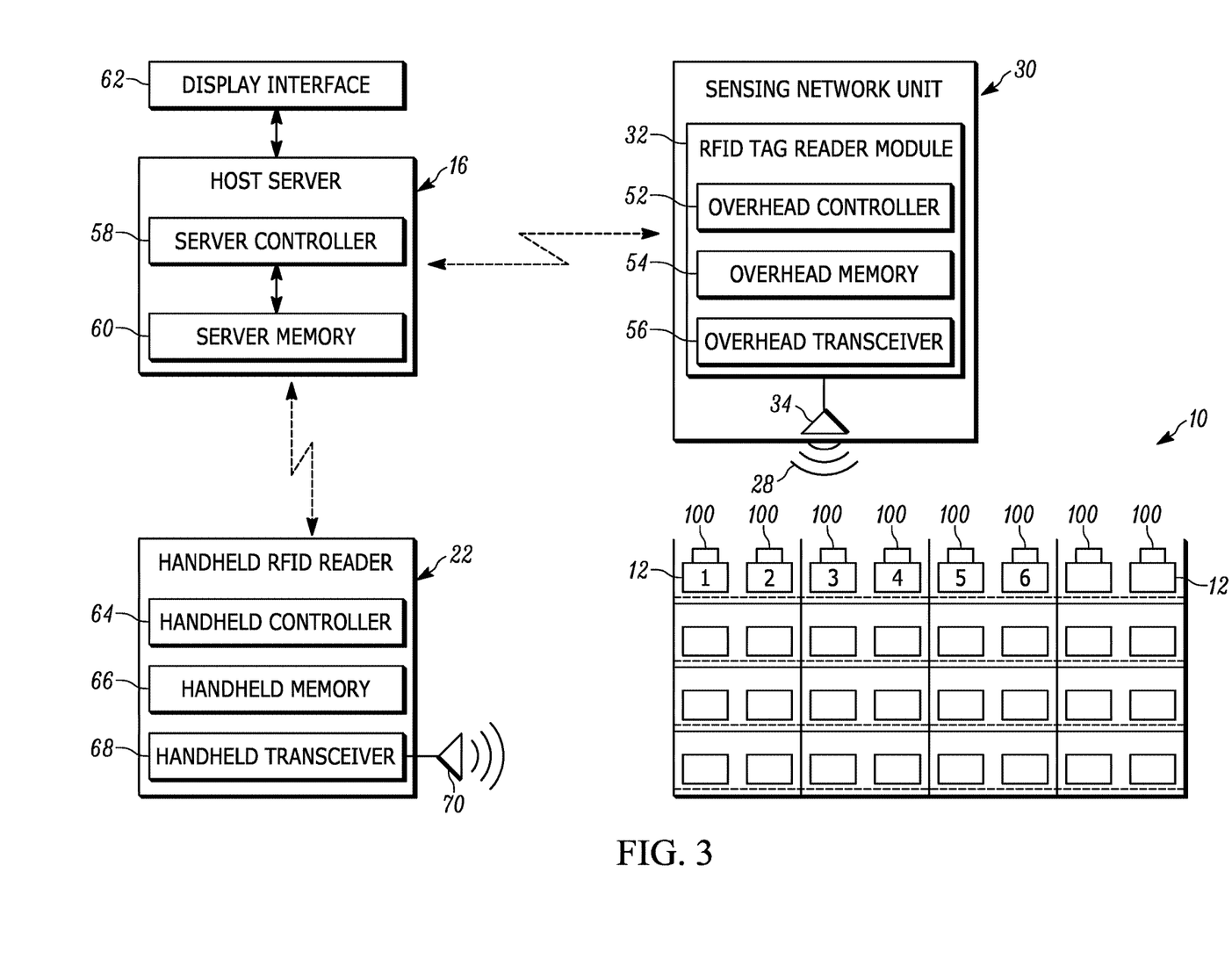

As also shown in FIG. 1, a plurality of sensing network units 30 is deployed in the venue 10. Sensing network units 30 are stationarily and fixedly mounted overhead, for example, on, or adjacent to, a ceiling 15. In some embodiments, the sensing network units 30 are installed every twenty to eighty feet or so in a grid pattern. A network computer or host server 16, typically locally located in a backroom at the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 can control each sensing network unit 30. As shown in FIG. 3, the server 16 includes a controller 58 and a memory 60 which can include a database having information related to various items described herein and their attributes. The server 16 is also connected to a display interface 62. It should be understood that references to a server 16 providing configuration/instructions/control in a certain way shall also apply to the controller 58 providing configuration/instructions/control in the same/similar manner.

Figure 4:
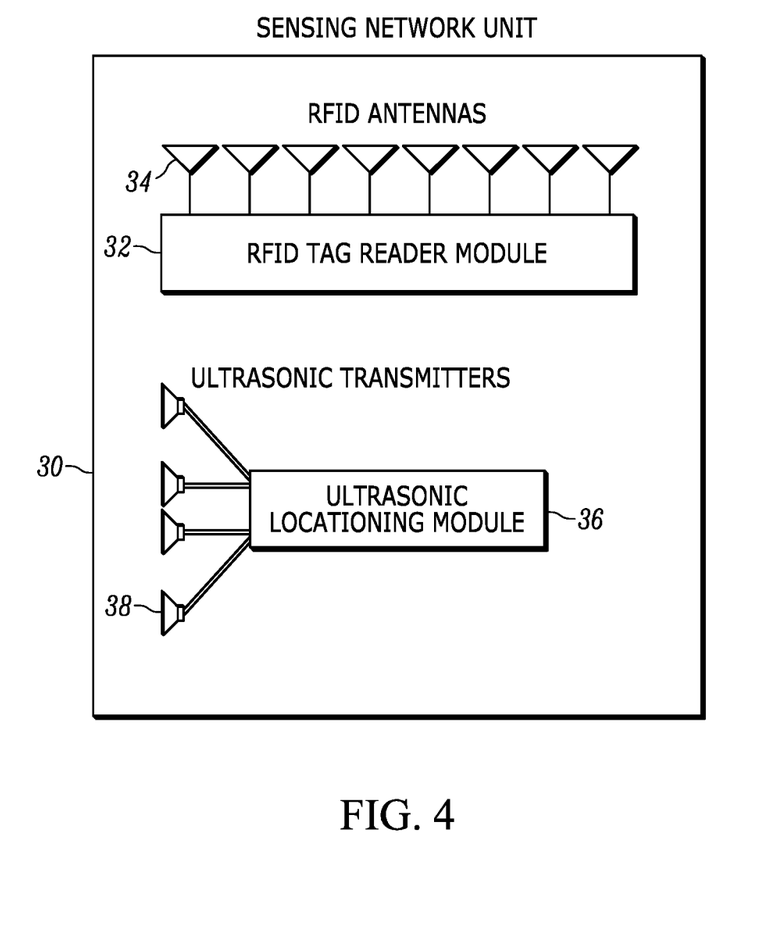
FIG. 4 illustrates a block diagram of an exemplary sensing network unit together with its internal components.

The block diagram of FIG. 4 depicts various sensing systems that can be mounted in each overhead sensing network unit 30. One of these sensing systems is an RFID tag reader operative for reading the tags 100 over a corresponding plurality of coverage ranges or read-zones. More particularly, each overhead RFID reader includes an RFID tag reader module 32 that has, as shown in FIG. 3, a controller 52, a memory 54, and an RF transceiver 56, which are operatively connected to a plurality of RFID antenna elements 34, which are energized by the RFID module 32 to radiate an RF beam 28 over an antenna field pattern. The RF transceiver 56 is operated, under the control of the controller 52 and/or the controller 58, to transmit RF beams 28 to the tags 100, and to receive RF response signals from, the tags 100, thereby interrogating and processing the payloads of the tags 100 that are in its read-zone. The payload or captured target data identifies the tags 100 and their associated products. As shown in FIGS. 2 and 3, the server 16 controls the overhead RFID readers in the plurality of sensing network units 30 to read the tags 100 on the products 1-6 in a stationary reading mode of operation in accordance with a set of reading parameters, as described below.

Another of the sensing systems is an ultrasonic locationing system operative for locating an ultrasonic-capable mobile device by transmitting an ultrasonic signal to an ultrasonic receiver, e.g., a microphone, on a mobile device 22 along (see FIG. 1). A positive identification of a mobile device 22 may be associated with a presence of a person (user) 24. More particularly, the locationing system includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader 22. The receipt of the ultrasonic energy at the microphone locates the mobile device 22. Each ultrasonic speaker 38 periodically transmits ultrasonic ranging signals, preferably in short bursts or ultrasonic pulses, which are received by the microphone on the mobile reader 22. The microphone determines when the ultrasonic ranging signals are received. The locationing module 36, under the control of the server 16, directs all the speakers 38 to emit the ultrasonic ranging signals such that the microphone on the mobile reader 22 will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone and of the mobile device 22, using a suitable locationing technique, such as triangulation, trilateration, multilateration, etc, as diagrammatically shown by dashed lines 20 in FIG. 1.

During normal operation, sensing network units 30 are configured to operate around the clock, continuously tracking products 12 via RFID. However, due to the fixed nature of the sensing network units 30 and the possibility that RF beams 28 may be obstructed, preventing accurate reading of certain products 12 (via their respective RFID tags 100), a more mobile and directional RFID reader can be used to conduct a more-targeted product accounting (or any other operation associated with reading RFID tags 100).

Referring to FIGS. 1 and 2, the more-targeted RFID reading can be conducted by a user 24 (e.g., a venue employee, any authorized person, etc.) with a mobile device 22 having a mobile RFID reader therein. As shown in FIG. 3, the mobile device 22 has a controller 64, a memory 66, and an RF transceiver 68 operatively connected to an RFID antenna 70. In some embodiments, to initiate an RFID read operation, the user manually actuates an actuator or trigger 26 on the mobile reader 22. In some embodiments, an RFID read operation can also be triggered automatically upon, for example, optically capturing a barcode symbol that signals the need to perform an RFID read operation. More than one mobile device 22 may be present and movable in the venue 10 and each of the mobile devices is communicatively connected with the host server 16 to enable transfer of data related to products 12 read via RFID. The communication link between the mobile device 22 and the host server 16 can be implemented via any number of direct or indirect wireless communication means, and can include any of the aforementioned wireless communication links that have been described previously with respect to links between the host server 16 and each of the sensing network units 30.

While effective to some extent, it has been recognized that when the mobile reader 22 is used in conjunction with the normal operation of the sensing network units 30, RF interference can occur, degrading the integrity of the read operations performed by the mobile reader 22. To address this issue, the host controller 58 is configured to selectively deactivate the RFID readers within the sensing network units 30 as detailed further below.

Figure 5:
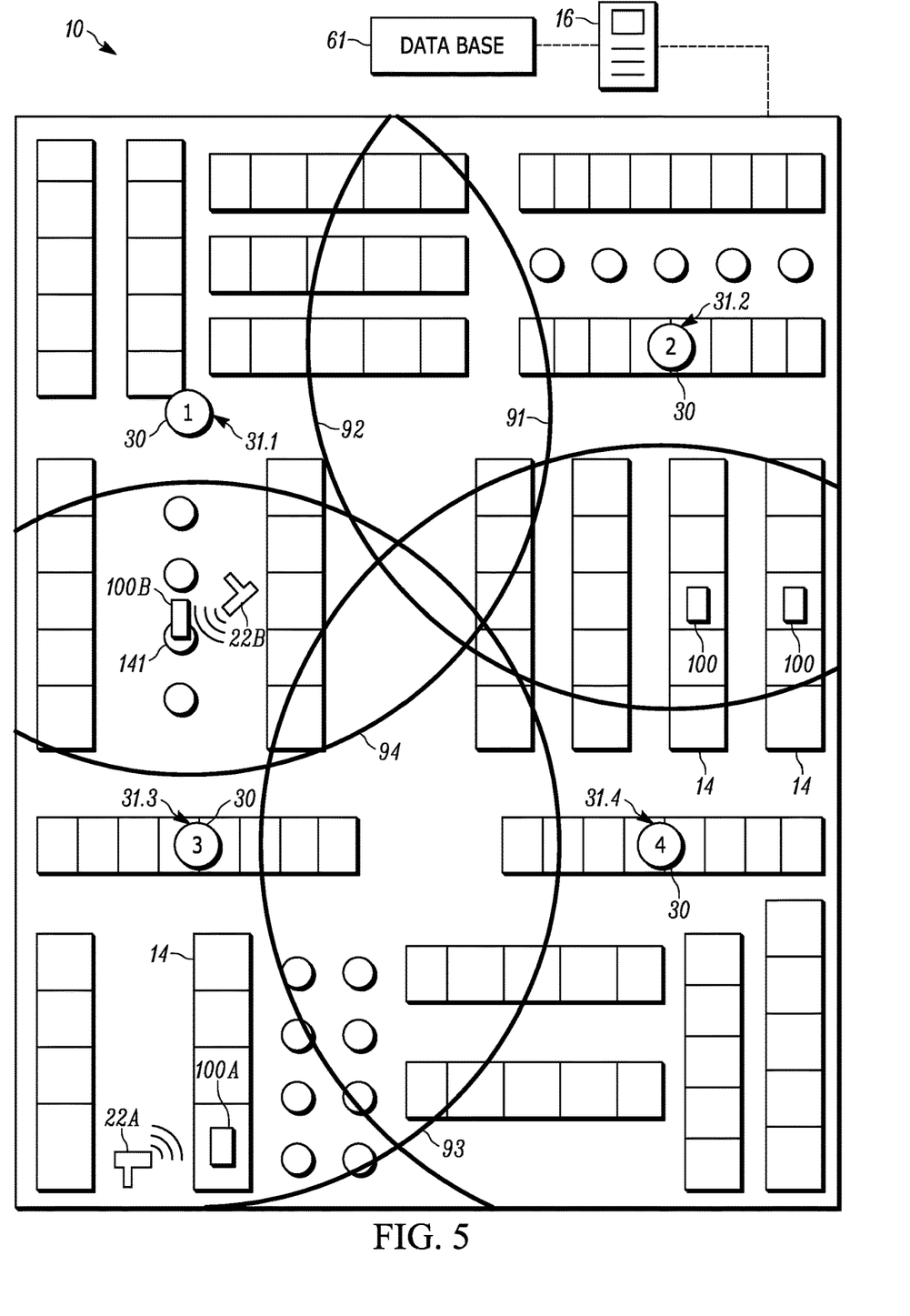
FIG. 5 illustrates a top schematic view of an exemplary venue having a plurality of fixed RFID readers and mobile RFID readers therein.

Referring to FIG. 5, shown therein is an exemplary venue 10 having a plurality of shelves 14 disposed therethrough, for stocking a plurality of products (not shown) with RFID tags 100 attached thereto. It should be noted that while references are being made to RFID tags being attached to products, such references are merely exemplary, and RFID tags 100 can be attached to any number of things within the venue such as, for instance, shelves, carts, pallets, displays, equipment, and so on. The venue includes a plurality of fixedly mounted sensing network units 30, each having a respective RFID reader 31.1-31.4 with an RFID antenna that defines the reader's read-zone. The read-zone of RFID reader 31.1 extends in a circular pattern from the reader 31.1 out to the maximum range defined by the line 91, the read-zone of RFID reader 31.2 extends in a circular pattern from the reader 31.2 out to the maximum range defined by the line 92, the read-zone of RFID reader 31.3 extends in a circular pattern from the reader 31.3 out to the maximum range defined by the line 93, and the read-zone of RFID reader 31.4 extends in a circular pattern from the reader 31.4 out to the maximum range defined by the line 94. Each of the RFID readers 31.1-31.4 is networked to the server 16 which includes a database 61 for storing data related to RFID tags 100 and/or articles to which the RFID tags 100 are attached to. In the currently described embodiment, the database 61 includes inventory data that, for each of the RFID tags 100 attached to a plurality of products disposed within the venue 10, specifies an approximate tag location within the venue.

In addition to the fixed RFID readers 31.1-31.4, two mobile RFID readers 22A and 22B are illustrated as being configured to operate within the venue 10. Each of the mobile RFID readers 22A and 22B is operable to interrogate RFID tags 100. Additionally, each mobile RFID reader 22A and 22B is communicatively networked/coupled to the server 16 and database 61 to enable transfer of data related to the RFID tags 100 and the operation of the mobile readers.

To reduce or eliminate RF interference between the fixed RFID readers 31.1-31.4 and the mobile RFID readers 22A, 22B, the server controller is configured to selectively deactivate at least one of the RFID readers 31.1-31.4 upon a detection of an activation of a read operation on any one of the mobile RFID readers 22A, 22B. The read operation can be detected in any number of way. For example, the activation of the mobile reader's trigger can be transmitted to host 16, indicating that the mobile reader 22A/22B has been activated and it is actively attempting to perform a read operation. In another example, a successful reading of an RFID tag by the mobile reader 22A/22B can also act as a signal that a read operation is being executed on the mobile reader. In yet another example, the user may put the mobile reader 22A/22B into a read-mode signifying that for a predetermined amount of time the mobile reader will be performing various read operations. The mobile device can be put into such a mode via, for example, a user interface that could be provided on the mobile reader, and the placement of the mobile reader into a read-mode can be transmitted to the host 16 to indicate the execution of a read operation by the mobile reader.

In the currently described embodiment, the server controller 58 is configured to detect a mobile RFID reader read operation based on at least one RFID tag being read by that reader. For example, the interrogation the RFID tag 100A by the mobile reader 22A would be transmitted to and registered by the host 16, signaling the detection of the mobile reader performing a read operation on RFID tag 100A. Similarly, the interrogation the RFID tag 100B by the mobile reader 22B would be transmitted to and registered by the host 16, signaling the detection of the mobile reader performing a read operation on RFID tag 100B.

Upon receiving information from the mobile reader 22A/22B regarding the interrogated RFID tag 100A/100B, the server is configured to look up the RFID tag location data in the database 61. This can be done via, for example, a look-up table or by searching for the acquired RFID identifier in the database and obtaining the corresponding approximate tag location therefrom. Given that the mobile readers have a relatively short range, one may assume that a mobile reader is within a general/approximate area of the RFID tag that it interrogates. As a result, a read of RFID tag 100A with the mobile reader 22A would place the reader 22A in the approximate location of the tag 100A. Since the approximate tag location of RFID tag 100A is known (recoded in the database), that same location can be associated with the approximate location of the mobile reader 22A. Likewise, a read of RFID tag 100B with the mobile reader 22B would place the reader 22B in the approximate location of the tag 100B. Since the approximate tag location of RFID tag 100B is known (recoded in the database), that same location can be associated with the approximate location of the mobile reader 22B.

Having determined the location information of the mobile readers 22A and 22B, the server 16 can evaluate those locations against the read-zones of each of the fixed RFID readers 31.1-31.4 to determine which read-zone encompasses the mobile reader 22A/22B. The range of the read-zones of each of the fixed RFID readers can be prerecorded into, for example, the database 61 of the server. Alternately, the range may be dynamically updated based on the parameters of the fixed readers (e.g., power, directionality, operating frequency, operating session, etc). Based on this evaluation, the server 16 would determine that the mobile RFID reader 22A is positioned within the read-zone of fixed RFID reader 31.3. Having this information, the server can further instruct RFID reader 31.3 to deactivate, and allow mobile device 22A to conduct RFID tag interrogations substantially or completely without interference. Likewise, the server 16 would also determine that the mobile RFID reader 22B is positioned within the read-zones of fixed RFID reader 31.1 and 31.3. Having this information, the server can further instruct RFID readers 31.1 and 31.3 to deactivate, and allow mobile device 22B to conduct RFID tag interrogations substantially or completely without interference. It is apparent that in case of the mobile device 22B, it is positioned within the range of two fixed RFID readers (31.1 and 31.3). This occurrence is treated as any other, in that the server 16 instructs all fixed RFID readers whose read-zones encompass the mobile reader to deactivate. As such, in this case, RFID readers 31.1 and 31.3 are instructed to deactivate.

It should be noted that as used herein, references to deactivating any of the fixed RFID readers is not intended to be limited to complete deactivation. Instead, deactivation of a fixed RFID reader can be (i) complete deactivation where its antenna ceases to emit any generated RF energy or (ii) partial deactivation where the level of RF energy emitted by its antenna is reduced to the level that is not likely to interfere with the RF operation of the mobile reader. In addition, the mobile reader may be configured to transmit its operational parameters to the host 16 such that the host can properly adjust the partial deactivation of the fixed reader based on the operational characteristics of the mobile reader in an effort to ultimately avoid interference.

Upon the deactivation of any of the fixed RFID readers, the server 16 is configured to maintain those readers in the deactivated state until the read operation of the mobile device is completed. In some embodiments, the completion of the read operation is signaled by the release of the trigger on the mobile device. In some embodiments, the completion of the read operation is signaled by the expiration of time for which the device has been set to run in a read mode. In some embodiments, the completion of the read operation is signaled by the passage of a predetermined amount of time after the mobile reader has read the last RFID tag. In some embodiments, the completion of the read operation is signaled by the server detecting that the mobile device is interrogating RFID tags outside of the read-zone of the deactivated fixed RFID reader. At the completion of the read operation by the mobile RFID reader, the server 16 instructs the previously deactivated fixed reader(s) to reactivate and resume normal operation.

Those of ordinary skill in the art will recognize that RFID tags can be switched between states and RFID readers can operate in different sessions. This allows for some RFID tags to be read selectively as required by various inventory application. This, however, also creates problems where not all RFID tag will respond to an RFID reader when the reader is operating in a session designed to read tags that are in their default states. To address this concern, the server 16 can be configured to instruct each of the fixed RFID reader that are to be deactivated, as described above, to first operate in a session that causes RFID tags to transition to their default state. This allows RFID tags located within the vicinity of the mobile reader to be prepared for a read-operation that it to be performed by a mobile RFID reader operating in a session that causes all tags in their default state to respond. This advantageously prevents the mobile reader from unintentionally omitting reading certain tags.

In some implementations, the mobile reader 22 may encounter an RFID tag that does not have corresponding location data saved in the server database. This can happen in instances where a product includes multiple RFID tags attached thereto, with only some of them having their respective approximate location data recorded in the database. Likewise, it can happen where some instances of a product have RFID tags with location data recorded and some other instances of the same product have RFID tags with location data omitted. To address this issue, the so-called the unlocated RFID tags are associated with respective universal product codes (UPCs) and this correspondence is stored in the server database. Additionally, the RFID tags with known approximate locations (so-called located RFID tags) are also associated with respective UPCs and this correspondence is also stored in the server database. Upon reading an RFID tag that has no associated location data (i.e., an unlocated RFID tag), the server attempts to locate a UPC code associated with a located RFID tag that is equal to the UPC of the unlocated RFID tag. If such a match is located, it is assumed that the unlocated RFID tag is in approximately the same area as a located RFID tag with the same UPC. This assumption can be made since the same UPC is likely to indicate the RFID tags are attached to the same product or that the RFID tags are attached to the same kinds of products that are likely to be positioned together in close proximity. Based on such a location of an unlocated RFID tag, the server 16 can once again proceed to deactivate the appropriate fixed RFID reader(s) as described earlier.

While the previous embodiments described locating the mobile RFID readers via RFID tag location data, in some instances, it may be advantageous to use a locationing subsystem to replace or supplement the mobile reader location data obtained through RFID tag location data. This approach can be useful in instances where RFID tag location data is not available or where a second layer of location determination is desired. An exemplary locationing subsystem can use ultrasonic locationing by utilizing the ultrasonic locationing modules within the sensing network units and a microphone on the mobile reader 22, as described earlier in the text. Once the location of the mobile device is located, the server can, as in the prior embodiments, instruct the relevant fixed RFID reader(s) to deactivate and/or respond accordingly.

It should be pointed out that while at least some embodiments have been described with reference to sensing network units and the RFID componentry installed therein, examples of the present invention that rely on RFID componentry do not necessarily require the presence of those sensing network unit. In other words, the fixed RFID readers can be embodied in any number of forms having as much or as little additional componentry as desired.

Figure 6:
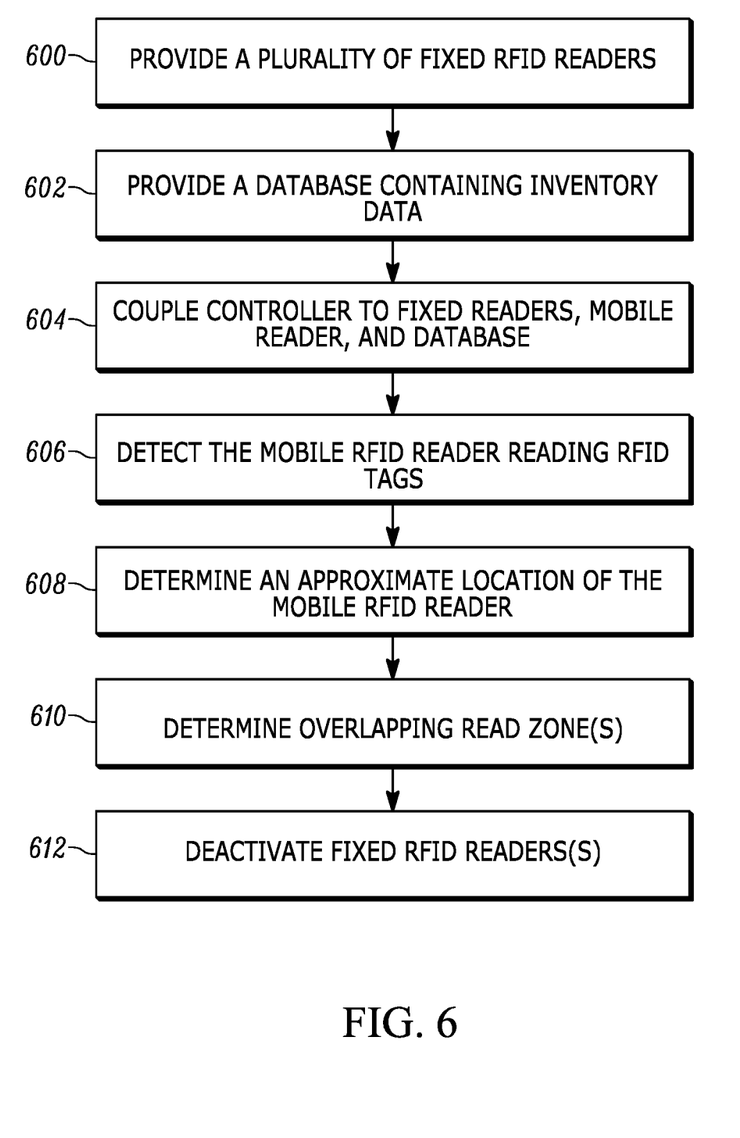
FIG. 6 illustrates a flowchart representative of a method of operating a mobile radio RFID reader in a venue having a network of fixed RFID readers, in accordance with an embodiment of the present invention.

Referring now to FIG. 6, shown therein is a flowchart representative of a method in accordance with an embodiment of the present disclosure. The method is directed to operating a mobile RFID reader in a venue having a network of fixed RFID readers. In step 600, the method includes providing a plurality of fixed RFID readers, each of the plurality of fixed RFID readers having an antenna defining a respective read-zone. In step 602, the method includes providing a database containing inventory data related to a plurality of RFID tags, for each of the plurality of RFID tags the inventory data including an approximate tag location within the venue. In step 604, the method includes communicatively coupling a controller to the plurality of fixed RFID readers, the mobile RFID reader, and the database. In step 606, the method includes detecting, via the controller, the mobile RFID reader reading at least one of the plurality of RFID tags. In step 608, the method includes determining an approximate location of the mobile RFID reader based on the respective approximate tag location of each of the at least one of the plurality of RFID tags read by the mobile RFID reader. In step 610, determining which of the respective read-zones overlaps with the approximate location of the mobile RFID reader. And in step 612, the method includes deactivating, via the controller, each of the fixed RFID readers whose antennae have the respective read-zones overlap with the approximate location of the mobile RFID reader.

Embodiments of the present invention can be particularly advantageous as they do not necessarily require the deactivation of fixed readers venue-wide. In addition, deactivation can occur for relatively short periods of time. Such short and/or localized deactivation may reduce the likelihood that RFID events will be missed by the network of fixed RFID readers, increasing and/or maintaining overall tracking system performance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for operating a mobile radio frequency (RF) identification (RFID) reader in a venue having a network of fixed RFID readers, the system comprising:
    a plurality of fixed RFID readers, each of the plurality of fixed RFID readers having an antenna defining a respective read-zone;
    a database containing inventory data related to a plurality of RFID tags, for each of the plurality of RFID tags the inventory data including a tag location within the venue; and
    a controller communicatively coupled to the plurality of fixed RFID readers, the mobile RFID reader, and the database, the controller being configured to:
        detect the mobile RFID reader reading at least one of the plurality of RFID tags;
        determine a location of the mobile RFID reader based on the respective tag location of each of the at least one of the plurality of RFID tags read by the mobile RFID reader;
        determine which of the respective read-zones overlaps with the location of the mobile RFID reader; and
        deactivate each of the fixed RFID readers whose antennae have the respective read-zones overlap with the location of the mobile RFID reader.

2. The system of claim 1, wherein each of the plurality of fixed RFID readers is configured to operate continuously over a 24-hour period.

3. The system of claim 1, wherein the controller is further configured to deactivate each of the fixed RFID readers, whose antennae have the respective read-zones overlap with the location of the mobile RFID reader, after causing each of the fixed RFID readers, whose antennae have the respective read-zones overlap with the location of the mobile RFID reader, to operate in a session operable to cause at least some of the plurality of RFID tags to transition to a default state.

4. The system of claim 1, wherein the controller is further configured to:
    detect the mobile RFID reader completing the reading the at least one of the plurality of RFID tags; and
    reactivate the each of the fixed RFID readers whose antennae have the respective read-zones overlap with the location of the mobile RFID reader.

5. The system of claim 1, wherein the controller is further configured to detect the mobile RFID reader reading the at least one of the plurality of RFID tags via a wireless signal sent by the mobile RFID reader to a wireless access point communicatively connected to the controller.

6. The system of claim 1,
wherein the database includes additional inventory data related at least one unlocated RFID tag, for each of the at least one unlocated RFID tag the additional inventory data including a corresponding unlocated RFID tag universal product code (UPC);
wherein, for each of the plurality of RFID tags, the inventory data further includes a corresponding located RFID tag UPC, and
wherein the controller is further configured to:
detect the mobile RFID reader reading a first unlocated RFID tag; and
determine the location of the mobile RFID reader based on the respective location of at least one of the plurality of RFID tags that has the corresponding located RFID tag UPC equal to the corresponding unlocated RFID tag UPC of the first unlocated RFID tag.

7. The system of claim 1, wherein the controller is configured to deactivate the each of the fixed RFID readers whose antennae have the respective read-zones overlap with the location of the mobile RFID reader one of partially or fully.

8. A system for operating a mobile radio frequency (RF) identification (RFID) reader in a venue having a network of fixed RFID readers, the system comprising:
a locationing sub-system operable to detect a location of the mobile RFID reader;
a plurality of fixed RFID reader, each of the plurality of fixed RFID readers having an antenna defining a respective read-zone; and
a controller communicatively coupled to the plurality of fixed RFID readers, the mobile RFID reader, and the locationing sub-system, the controller being configured to:
detect a triggering of an RFID-tag read operation on the mobile RFID reader;
determine which of the respective read-zones overlaps with the location of the mobile RFID reader at a time of the triggering of the RFID-tag read operation; and
deactivate each of the fixed RFID readers whose antennae have the respective read-zones overlap with the location of the mobile RFID reader.

9. The system of claim 8, wherein each of the plurality of fixed RFID readers is configured to operate continuously over a 24-hour period.

10. The system of claim 8, wherein the controller is further configured to deactivate each of the fixed RFID readers, whose antennae have the respective read-zones overlap with the location of the mobile RFID reader, after causing each of the fixed RFID readers, whose antennae have the respective read-zones overlap with the location of the mobile RFID reader, to operate in a session operable to cause at least some of the plurality of RFID tags to transition to a default state.

11. The system of claim 8, wherein the controller is further configured to:
detect a completion of the RFID-tag read operation; and
reactivate the each of the fixed RFID readers whose antennae have the respective read-zones overlap with the location of the mobile RFID reader.

12. The system of claim 8, wherein the controller is further configured to detect the triggering of the RFID-tag read operation on the mobile RFID reader via a wireless signal sent by the mobile RFID reader to a wireless access point communicatively connected to the controller.

13. The system of claim 8, wherein the controller is configured to deactivate the each of the fixed RFID readers whose antennae have the respective read-zones overlap with the location of the mobile RFID reader one of partially or fully.

14. A method of operating a mobile radio frequency (RF) identification (RFID) reader in a venue having a network of fixed RFID readers, the method comprising:
providing a plurality of fixed RFID readers, each of the plurality of fixed RFID readers having an antenna defining a respective read-zone;
providing a database containing inventory data related to a plurality of RFID tags, for each of the plurality of RFID tags the inventory data including a tag location within the venue;
communicatively coupling a controller to the plurality of fixed RFID readers, the mobile RFID reader, and the database;
detecting, via the controller, the mobile RFID reader reading at least one of the plurality of RFID tags;
determining a location of the mobile RFID reader based on the respective tag location of each of the at least one of the plurality of RFID tags read by the mobile RFID reader;
determining which of the respective read-zones overlaps with the location of the mobile RFID reader; and
deactivating, via the controller, each of the fixed RFID readers whose antennae have the respective read-zones overlap with the location of the mobile RFID reader.

15. The method of claim 14, wherein each of the plurality of fixed RFID readers is configured to operate continuously over a 24-hour period.

16. The method of claim 14, further comprising:
prior to the operation of deactivating each of the fixed RFID readers, operating each of the fixed RFID readers, whose antennae have the respective read-zones overlap with the location of the mobile RFID reader, in a session operable to cause at least some of the plurality of RFID tags to transition to a default state.

17. The method of claim 14, further comprising:
detecting the mobile RFID reader completing the reading the at least one of the plurality of RFID tags; and
reactivating the each of the fixed RFID readers whose antennae have the respective read-zones overlap with the location of the mobile RFID reader.

18. The method of claim 14,
wherein the database includes additional inventory data related at least one unlocated RFID tag, for each of the at least one unlocated RFID tag the additional inventory data including a corresponding unlocated RFID tag universal product code (UPC);
wherein, for each of the plurality of RFID tags, the inventory data further includes a corresponding located RFID tag UPC, and
wherein the method further includes:
detecting, via the controller, the mobile RFID reader reading a first unlocated RFID tag; and
determining the location of the mobile RFID reader based on the respective location of at least one of the plurality of RFID tags that has the corresponding located RFID tag UPC equal to the corresponding unlocated RFID tag UPC of the first unlocated RFID tag.

19. The method of claim 14, wherein the operation of deactivating each of the fixed RFID readers includes one of partially deactivating the each of the fixed RFID readers and fully deactivating the each of the fixed RFID readers.

\* \* \* \* \*